(12) United States Patent
Hariya et al.

(10) Patent No.: US 6,578,189 B2
(45) Date of Patent: Jun. 10, 2003

(54) HEXAHEDRAL MESH GENERATION METHOD AND DEVICE

(75) Inventors: Masayuki Hariya, Chiyoda (JP); Ichiro Nishigaki, Ishioka (JP); Yoshimitsu Hiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 123 days.

(21) Appl. No.: 09/915,302

(22) Filed: Jul. 27, 2001

(65) Prior Publication Data

US 2002/0144231 A1 Oct. 3, 2002

(30) Foreign Application Priority Data

Feb. 16, 2001 (JP) ........................................ 2001-039346

(51) Int. Cl.[7] .............................................. G06F 17/50
(52) U.S. Cl. ....................................................... 716/20
(58) Field of Search ....................... 716/19–21; 345/423

(56) References Cited

U.S. PATENT DOCUMENTS 5,654,771 A * 8/1997 Tekalp et al. ................ 348/699
5,729,670 A * 3/1998 Strumolo et al. ............ 345/423
6,124,857 A * 9/2000 Itoh et al. .................... 345/423

* cited by examiner

Primary Examiner—Cuong Quang Nguyen
(74) Attorney, Agent, or Firm—Antonelli, Terry, Stout & Kraus, LLP

(57) ABSTRACT

A hexahedral mesh generation device comprises a shape model reader that reads an analysis object shape model, a polygonal patch generator that generates polygonal patches on the surface of the shape model, a mapping model generator that has a function to select line segments necessary for generating a mapping model from boundaries between polygonal patches, and a analysis mesh generator that generates an analysis mesh from the mapping model.

28 Claims, 13 Drawing Sheets

FIG. 1
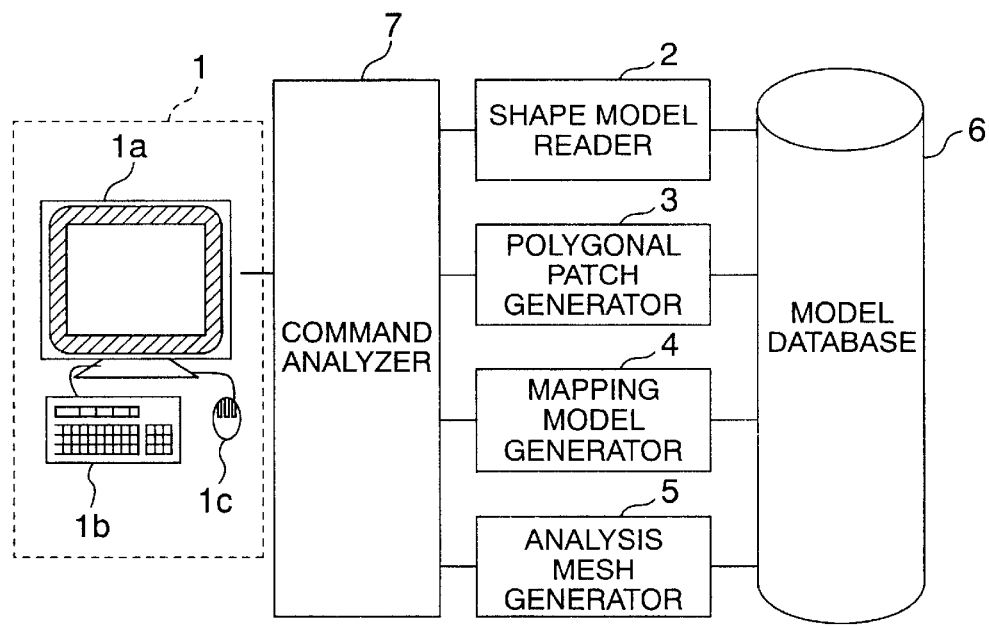
FIG. 2A
SHAPE MODEL
FIG. 2B
MAPPING MODEL
FIG. 2C
HEXAHEDRAL MESH
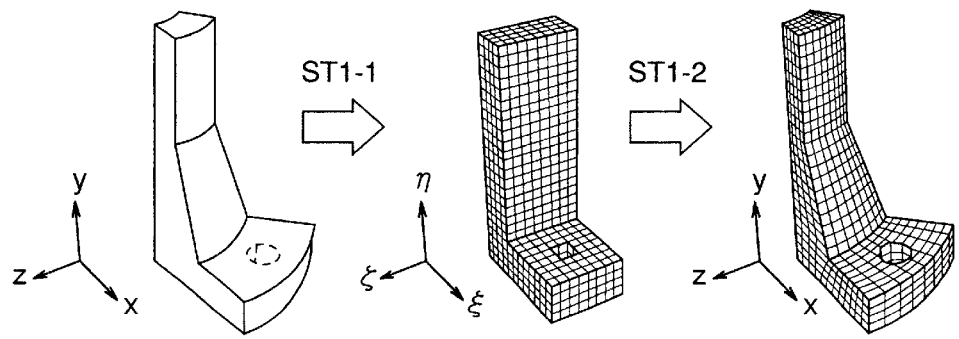

SHAPE MODEL

31 DELETED LINE SEGMENTS

MODIFIED SHAPE MODEL

32 ADDED LINE SEGMENTS

MAPPING MODEL

HEXAHEDRAL MESH

SHAPE MODEL

POLYGONAL PATCHES

MAPPING MODEL

HEXAHEDRAL MESH

HEXAHEDRAL MESH
(PARTIAL DISPLAY)

FIG. 5

| MODEL IDENTIFIER | SHAPE MODEL DATA | POLYGONAL PATCH DATA | MAPPING MODEL DATA | HEXAHEDRAL MESH DATA |
|---|---|---|---|---|

FIG. 6

| PATCH SIZE | 4mm |
|---|---|
| PATCH LAYOUT | ☐ NONE<br>■ PARALLEL WITH COORDINATE AXES<br>☐ VERTICAL TO FACE BOUNDARY |

EXAMPLE OF POLYGONAL PATCH

POLYGONAL PATCH DATA

| PATCH PLANE NUMBER | THE NUMBER OF PATCH LINES | PATCH LINE NUMBER |
|---|---|---|
| PF1 | 3 | 3,2,1 |
| PF2 | 3 | 5,4,3 |

| PATCH LINE NUMBER | START NUMBER | END NUMBER |
|---|---|---|
| PL1 | 1 | 3 |
| PL2 | 1 | 2 |
| PL3 | 3 | 2 |
| PL4 | | |

| PATCH POINT NUMBER | x-COORDINATE-VALUE | y-COORDINATE-VALUE | z-COORDINATE-VALUE |
|---|---|---|---|
| PP1 | 9.0 | 5.0 | 0.0 |
| PP2 | 7.0 | 0.0 | 0.0 |
| PP3 | 5.0 | 7.0 | 0.0 |
| PP4 | 3.0 | | |

PATCH WITH MAXIMUM PARALLELISM DEGREE

PATCH WITH MINIMUM PARALLELISM DEGREE

CONDITION 1 SATISFIED

CONDITION 1 NOT SATISFIED

CONDITION 2 SATISFIED

CONDITION 2 NOT SATISFIED

FIG. 13A

DATA STRUCTURE OF MAPPING PLANE

| MAPPING PLANE NUMBER | LAYOUT DIRECTION | THE NUMBER OF PATCH PLANES | PATCH PLANE NUMBER |
|---|---|---|---|
| 1 | $+\xi$ | 10 | 1,2,3,4,5,6,7,8,9,10 |
| 2 | $-\zeta$ | 5 | 23,97,55,63,44 |
| 3 | $-\xi$ | 7 | 127,965,332,16,97,11,84 |
| 4 | $+\eta$ | 33 | |

FIG. 13B

DATA STRUCTURE OF MAPPING LINE SEGMENT

| MAPPING LINE SEGMENT NUMBER | LAYOUT DIRECTION | THE NUMBER OF PATCH LINES | PATCH LINE NUMBER |
|---|---|---|---|
| 1 | $+\eta$ | 6 | 2,4,8,16,1024,64 |
| 2 | $+\xi$ | 4 | 47,91,143,29 |
| 3 | $-\xi$ | 6 | 12,26,10,1,9,24 |
| 4 | $+\zeta$ | 8 | |

FIG. 13C

DATA STRUCTURE OF MAPPING POINT

| MAPPING POINT NUMBER | $\xi$ | $\eta$ | $\zeta$ | x | y | z |
|---|---|---|---|---|---|---|
| 1 | 2 | 1 | 5 | 2.21 | 1.05 | 11.3 |
| 2 | -2 | -3 | 4 | -2.27 | -5.87 | 7.98 |
| 3 | 10 | -3 | -2 | 9.94 | -5.25 | -3.77 |
| 4 | 5 | 5 | 5 | | | |

(A) EXAMPLE OF SCREEN DISPLAY (B) MAPPING MODEL

MAPPING MODEL

GENERATE NODES ON MAPPING LINE SEGMENT

PROJECT NODES ON AUXILIARY PLANE

ROTATE AUXILIARY PLANE

GENERATE NODES ON THE PLANE

ROTATE THE AUXILIARY PLANE

SURFACE MESH

SHAPE MODEL

POLYGONAL PATCHES

MAPPING MODEL

HEXAHEDRAL MESH

CONDITION 3 SATISFIED

CONDITION 3 NOT SATISFIED

CONDITION 4 SATISFIED

CONDITION 4 NOT SATISFIED

HEXAHEDRAL MESH GENERATION METHOD AND DEVICE

BACKGROUND OF THE INVENTION

The present invention relates to CAE (Computer Aided Engineering) that optimizes and streamlines design application through numerical analysis simulation using a computer, and more particularly to a technology for automatically generating a mesh for use in numerical analysis simulation.

Before performing numerical analysis simulation, an analysis mesh is generated for use in analysis computation. A tetrahedral or hexahedral mesh is used for a three-dimensional model. For better analysis precision and computation efficiency, a hexahedral mesh should preferably be used. The following describes conventional automatic hexahedral mesh generation methods.

A first conventional method is a mapping method. In this method, the line segments of the shape model of an analysis object are converted to straight line segments parallel with the rectangular coordinate axes, the converted straight line segments are arranged such that they are equivalent to the continuity of the line segments constituting the shape model, a mapping model is generated by dividing and transforming the arranged line segments into a grid, and, with the rectangular grid of the mapping model mapped to the shape model, a hexahedral mesh is generated. This method is disclosed in JP-A-1-311373 and JP-A-2-236677.

A second conventional method is an overlay method. In this method, surface shape data defining the surface shape of an analysis object is input, a fine hexahedral grid parallel with the coordinates axes of the coordinate system in which the analysis object shape is present is generated in the space completely including the analysis object shape, the grid on the inside and/or the surface of the analysis object shape is defined as a mesh, the grid near the surface is modified to represent the shape surface precisely, and a hexahedral mesh is generated. This method is described in U.S. Pat. No. 5,453,934 or in "Basics and Application of Automatic Mesh Generation", pp. 71–74 of document in Third Seminar by the Japan Society for Computational Engineering and Science (Mar. 11, 1998).

The conventional automatic hexahedral mesh generation methods have the problems described below.

When creating a mapping model from a shape model in the first method described above, all line segments of the shape model of an analysis object are converted to straight-line segments parallel with the rectangular coordinate axes, and then the converted line segments are arranged such that they are equivalent to the continuity of the line segments constituting the shape model. However, depending upon the continuity of the line segments constituting the shape model, the mapping model cannot be logically generated. In such a case, the system user must edit the shape before generating a mesh; for example, the user must add line segments to the shape model of an analysis object or delete line segments unnecessary for the generation of the mapping model. For an analysis object that is complex in shape, this preprocessing for mesh generation sometimes requires not only special know-how but also efforts and time.

In the second method, a fine grid parallel with the coordinates axes of the coordinate system, in which the analysis object shape is present, is generated in the space completely including the analysis object shape. Therefore, the number of hexahedral mesh elements increases, resulting in a long analysis calculation. In addition, although the grid elements near the surface are finally modified to represent the shape surface more precisely, highly distorted elements are sometimes generated near the shape surface where, in general, precision is required.

SUMMARY OF THE INVENTION

It is an object of the present invention to eliminate the need for shape editing required by the mapping method and to automatically generate a hexahedral mesh ensuring high-precision analysis with fewer elements.

To achieve the above objects, a hexahedral mesh generation device according to the present invention comprises a shape model reader that reads an analysis object shape model, a polygonal patch generator that generates polygonal patches on the surface of the shape model, a mapping model generator that generates a mapping model by modeling after the shape model with the use of a grid from the polygonal patches, and a analysis mesh generator that generates an analysis mesh from the mapping model.

BRIEF DESCRIPTION OF THE DRAWINGS

FIG. 1 is a diagram showing the overall configuration of a hexahedral mesh generation device.

FIGS. 2A–2C are diagrams showing a hexahedral mesh generation procedure using a mapping method.

FIG. 5 is a diagram showing an example of a table stored in a model database.

FIG. 6 is a diagram showing an example of a polygonal patch generation rule setup screen.

FIGS. 13A–13C are diagrams showing mapping model data tables.

DESCRIPTION OF THE EMBODIMENTS

1. Basic Algorithm for Mesh Generation in the Mapping Method

An analysis mesh generation method according to the present invention is based on the mapping method that maps the grid points of a mapping model to the shape model of an analysis object to generate a mesh. First, with reference to FIG. 2, the mesh generation algorithm for the mapping method used on the conventional hexahedral mesh generation device will be described.

ST1-1: Assume that the shape model of an analysis object is given as the (x, y, z) coordinates as shown in FIG. 2A. That is, assume that the geometric parameters of the shape model, such as line segment lengths and angles between each two line segments of the shape model, are already defined. Under these assumptions, a mapping model shown in FIG. 2B, topologically equivalent to the shape model, is generated based on the geometric parameters. A mapping model is a model generated by arranging the line segments of the shape model in parallel with the three axes, for example, the rectangular coordinate axes composed of (ξ, η, ζ), and then dividing the model, for example, into a cubic grid based on the standard mesh size entered by the system user. The mapping model is represented by the coordinate values (ξ, η, ζ) of the vertexes, the arrangement directions of the line segments of the mapping model, and the arrangement directions of the surfaces of the mapping model. In the description below, a space in which a shape model is present and in which a position is defined by the (x, y, z) coordinate values of the shape model is called a real space, while a space in which a mapping model is present and in which a position is defined by the (ξ, η, ζ) coordinate values of the mapping model is called a mapping space.

ST1-2: Map the grid points of the mapping model in FIG. 2B to the analysis object shape model to generate an analysis mesh as shown in FIG. 2C.

Figure 3A:
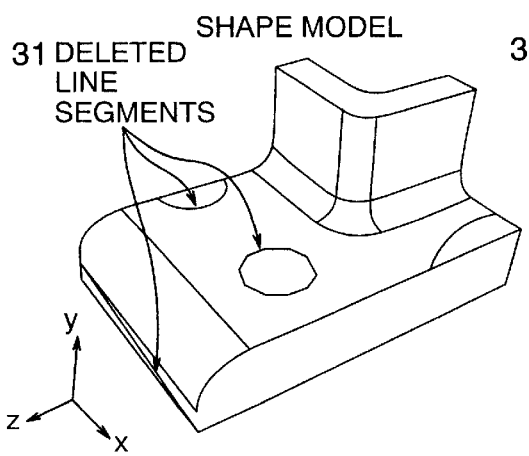
FIGS. 3A–3D are diagrams showing the flow of hexahedral mesh generation according to a conventional method.
Figure 3B:
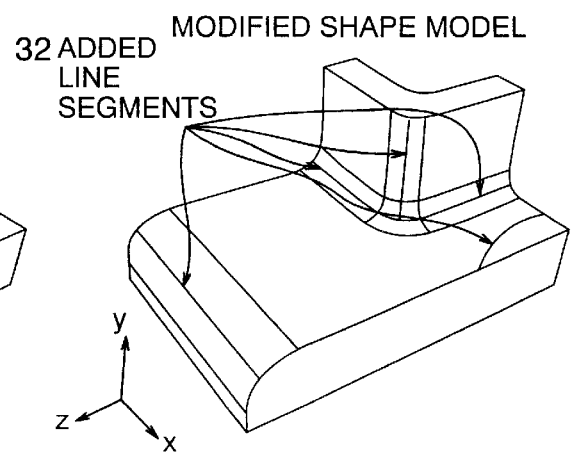
Figure 3C:
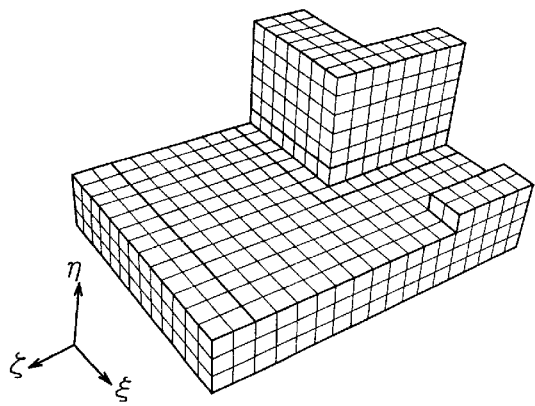
Figure 3D:
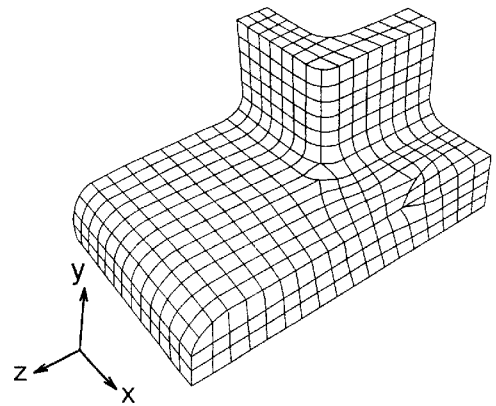

However, depending upon the continuity of the line segments constituting the shape model, the mapping model cannot be logically generated by the method described above. FIG. 3A shows an example. In the case of the shape model shown in FIG. 3A, the system user must do preprocessing to interactively edit the shape model before generating a hexahedral mesh. During shape model editing, line segments 32 are added as shown in FIG. 3B, or line segments 31 unnecessary for generating the mapping model are deleted from, the shape model. In this way, the shape model is modified so that a mapping model may be logically generated. From the modified shape model shown in FIG. 3B, a mapping model shown in FIG. 3C and a hexahedral mesh shown in FIG. 3D may be generated.

To generate a good quality hexahedral mesh, it is generally preferable to use a mapping model geometrically similar to the corresponding shape model. To use such a model, line segments necessary as a part of the external surface of the mapping model must be added to an appropriate position of the shape model. Conversely, line segments other than those used for the external surface of the mapping model are not necessary for the shape model. With this in mind, the system user performs shape editing interactively.

The problem described above arises because the line segments constituting the shape model are used directly to generate a mapping model. The mesh generation device according to the present invention generates polygonal patches on the surface of a shape model and extracts, from the boundaries between the polygonal patches, only the line segments necessary to generate a mapping model. This eliminates the need for the system user to do interactive shape editing.

2. Overall Structure of a Hexahedral Mesh Generation Device According to the Present Invention FIG. 1 is a block diagram showing the configuration of an embodiment of the hexahedral mesh generation device according to the present invention. The hexahedral mesh generation device according to the present invention comprises a command analyzer 7 that analyzes commands entered by the system user from an input/output device 1 and instructs the components of the mesh generation device to perform processing, a shape model reader 2, a polygonal patch generator 3, a mapping model generator 4, an analysis mesh generator 5, and a model database 6 in which shape models, polygonal patches, mapping models, and hexahedral meshes are related and stored.

As another configuration example of the mesh generation device, a polygonal patch reader may be provided instead of the shape model reader 2 and the polygonal patch generator 3 to read polygonal patches, pre-stored in the model database 6, as an analysis object shape. This configuration is possible because a shape model is read only to have polygonal patches generated thereon and because, in the subsequent mesh generation processing, the polygonal patches are used for forming the shape of the analysis object.

The operation of the components will be described with reference to the drawings.

The operation of the components will be described using an example of analysis mesh generation according to the method of the present invention. In this example, the hexahedral mesh shown in FIG. 4D is generated from the analysis object shape model shown in FIG. 4A.

3.0 Model Database

First, the configuration of the model database 6 will be described. In the model database 6, a unique identifier is assigned to each analysis object for management. The identifier may be a model number or a model name. FIG. 5 shows data stored in the model database. For each analysis object, shape model data, polygonal patch data generated by the polygonal patch generator 3, mapping model data generated by the mapping model generator 4, and hexahedral mesh data generated by the analysis mesh generator 5 are related and stored.

3.1 Shape Model Reader

Figure 4A:
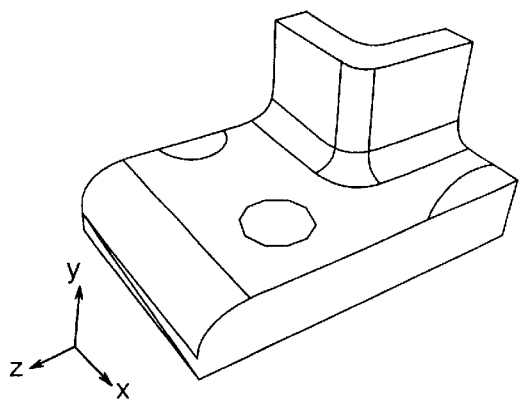
FIGS. 4A–4E are diagrams showing the flow of hexahedral mesh generation according to the present invention.

The shape model reader 2 reads an analysis object shape model, shown in FIG. 4A, from the model database 6 and displays it on a display 1a. The shape model reader 2 may have an additional function that creates or modifies a shape model in response to a shape model creation request or a modification request, which is entered by the system user from a keyboard 1b or a mouse 1c of the input/output device 1, and then stores the created or modified shape model into the model database 6.

Figure 18:
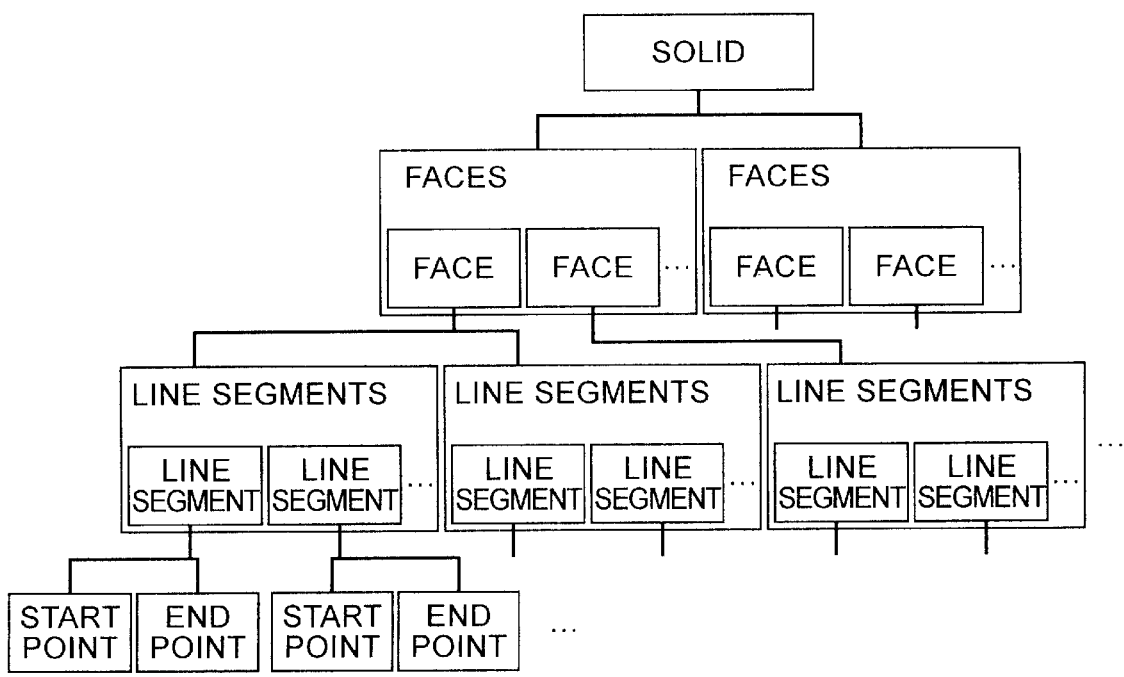
FIG. 18 is a diagram showing the structure of shape model data represented by a boundary representation method.

Shape model data may be represented, for example, using a boundary representation method. In the boundary representation method, a solid is represented by a boundary surface between the outside and the inside. Therefore, shape model data is represented by topology data representing the continuity of the boundary surface and by geometrical data (geometry) representing the shape of the boundary surface. FIG. 18 shows an example showing the structure of shape model data represented by the boundary representation method and, particularly, an In formula 1, the number of control points is $(n+1) \times (m+1)$, $N_{i,K}(u)$ and $M_{j,L}(V)$ are base functions in the parameter direction of u and v, and wij is the weight of each control point. The knot vector is $[x_0 x_1 \ldots x_p][y_0 y_1 \ldots y_q]$, where $p=n+K+1$ and $q=m+L+1$.

3.2 Polygonal Patch Generator

The polygonal patch generator 3 generates a patch group, composed of polygons, on the surface of the shape model read by the shape model reader 2 according to the procedure described below.

ST2-1: Generate polygon patches. To do so, any of general methods may be used, including the Delaunay method (Takeo Taniguchi, Shin Ota (Okayama University): Application of Delaunay Triangulation to Arbitrary Two-Dimensional Domain Composed of Straight Line Segments, pp. 69–77 in No. 432, Vol. 16 of Papers from Japan Society of Civil Engineers I (1991)) or the paving method (Blacker, T. D., Stephenson, M. B.: Paving A New Approach to Automated Quadrilateral Mesh Generation, Int. J. Num. Meth. Eng., 32,811 (1991)). A polygonal patch to be generated may be at any size. However, it should be noted that a smaller patch would generate a hexahedral mesh that represents the analysis object shape model more precisely.

At this time, the system user may also fill out the polygonal patch generation rule setup panel, such as the one shown in FIG. 6, by entering data or example of the topology data representation method. In the boundary representation method, a sold has a set of one or more continuous boundary surfaces belonging thereto, a surface has one or more line segments belonging thereto, and a line segment has a start point and an end point. A point has three-dimensional coordinates as the geometrical data. There are many geometric data representation methods for a line and a surface, and any of them may be used. In this specification, the NURBS function widely used for shape representation in the three-dimensional CAD is used. The definition function for the K×L degree surface with the use of NURBS is represented by formula 1.

$$\begin{cases} S_x(u, v) = \dfrac{\sum_{i=0}^{n}\sum_{j=0}^{m} N_{i,K}(u)M_{j,L}(v)W_{ij}P_{xij}}{\sum_{i=0}^{n}\sum_{j=0}^{m} N_{i,K}(u)M_{j,L}(v)W_{ij}} \\[4pt] S_y(u, v) = \dfrac{\sum_{i=0}^{n}\sum_{j=0}^{m} N_{i,K}(u)M_{j,L}(v)W_{ij}P_{yij}}{\sum_{i=0}^{n}\sum_{j=0}^{m} N_{i,K}(u)M_{j,L}(v)W_{ij}} \\[4pt] S_z(u, v) = \dfrac{\sum_{i=0}^{n}\sum_{j=0}^{m} N_{i,K}(u)M_{j,L}(v)W_{ij}P_{zij}}{\sum_{i=0}^{n}\sum_{j=0}^{m} N_{i,K}(u)M_{j,L}(v)W_{ij}} \end{cases} \quad \text{(Formula 1)}$$

selecting a check mark to control the shape of a polygonal patch to be generated. On the panel, the rules for the size and the shape of a polygonal patch and the patch layout may be specified.

Here, what effect these rules may have on mesh generation will be described. The patch size has the following effect. That is, the smaller the size, the more precisely the generated hexahedral mesh represents the surface of an analysis object shape model. On the other hand, a small patch size requires more computer resources (memory) and takes long to generate a mesh.

Figure 4B:
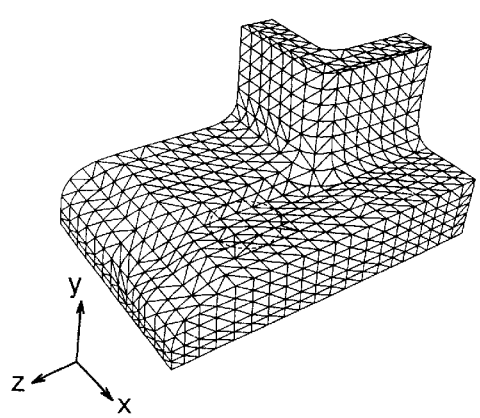

Next, the patch layout has the following effect on the quality of a hexahedral mesh that will be generated. For example, when the external shape of the analysis object is parallel with the coordinate axes, regularly generating patches parallel with the coordinate axes generates a good quality mesh. However, doing this takes long to control the patch shape. The polygonal patches shown in FIG. 4B are those generated on the surface of the shape model shown in FIG. 4A by selecting "Parallel with coordinate axes" for the patch layout on the panel shown in FIG. 6.

Figures 7A, 7B:
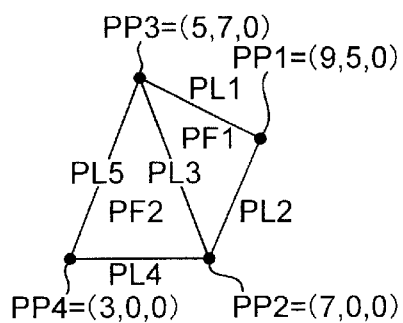
FIGS. 7A and 7B are diagrams showing an example of patch data tables.

ST2-2: Store the polygonal patches in the model database 6. FIGS. 7A and 7B show an example of the data structure of the patches stored in the model database 6. As shown in FIG. 7A, unique patch surface numbers (PF1, PF2, PF3, . . . ), patch line numbers (PL1, PL2, PL3, . . . ), and patch point numbers (PP1, PP2, PP3, . . . ) are assigned, respectively, to the polygonal patch surfaces, patch boundaries, and patch vertexes of each analysis object shape. Then, as shown in FIG. 7B, the number of patch lines that constitute a boundary as well as the patch line numbers in the counterclockwise direction when viewed from external of the model are stored for each patch surface; the patch point numbers (start point and end point numbers) are stored for each patch line; and the three-dimensional coordinate values (x-axis, y-axis, z-axis coordinate values) are stored for each patch point. This data structure assures easy data search in the subsequent processing.

3.3 Mapping Model Generator

Figure 8:
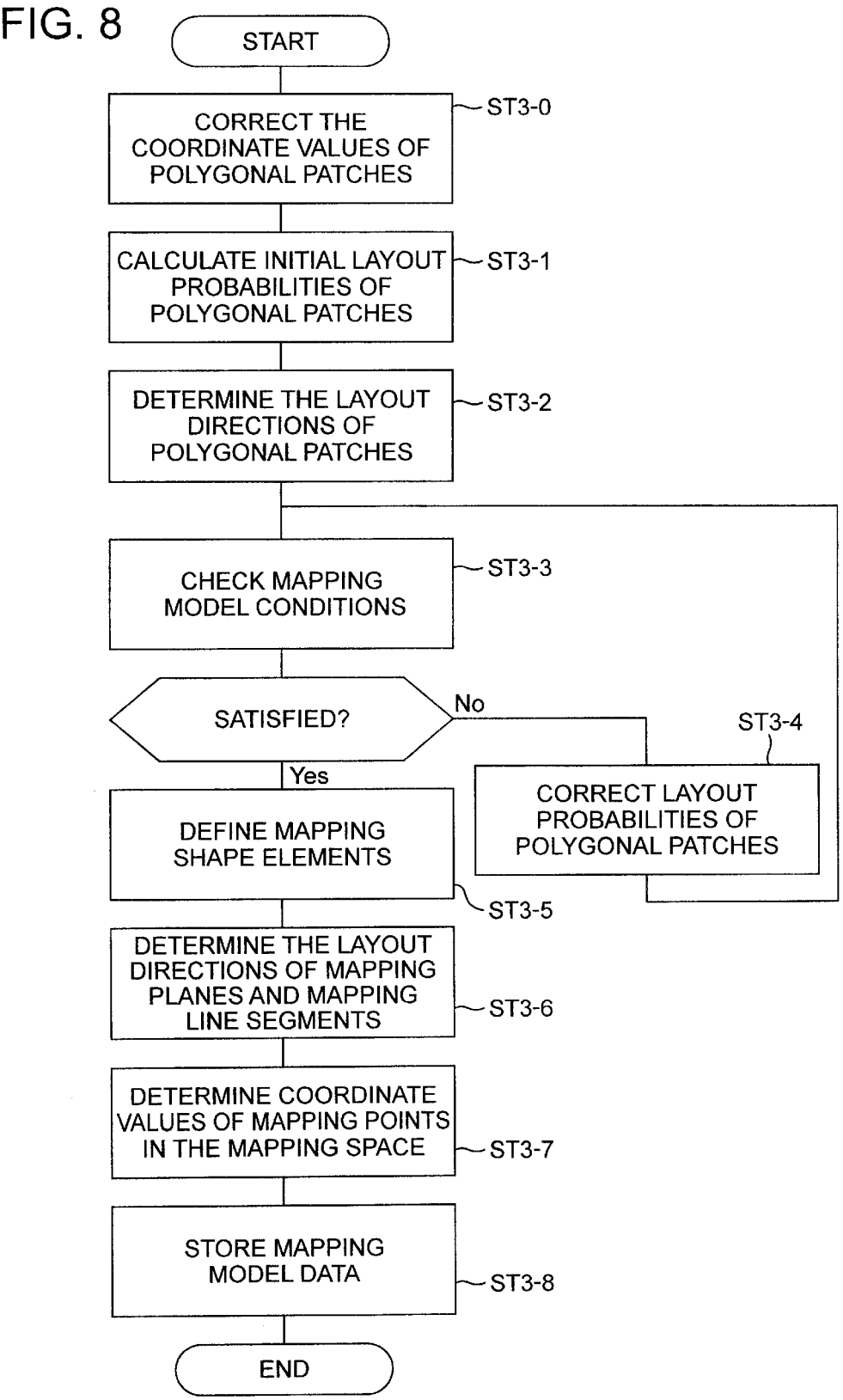
FIG. 8 is a diagram showing the processing flow of mapping model generation.

The mapping model generator 4 generates a mapping model from the polygonal patches generated by the polygonal patch generator 3. A mapping model is generated according to the processing flow shown in FIG. 8.

ST3-0: Correct the coordinate values of the polygonal patches with a patch corrector. As will be described in the subsequent steps, the shape of a mapping model generated by the mapping model generator 4 is determined by the normal vectors (a vector perpendicular to the patch surface) of the polygonal patches. In the following steps, the algorithm is that more polygonal patches with normal vectors parallel with any of the coordinate axes (x, y, z) in the real space generate a mapping model geometrically similar to the shape model (generate a good quality hexahedral mesh). To make best use of this algorithm, a value (parallelism degree) indicating the degree of parallelism between the polygonal patches and the coordinate axes is calculated. Then, the polygonal patches are rotated to maximize this value and therefore to correct the coordinate values accordingly. In this example, the parallelism degree PF is defined by formula 2.

$$PF = 1/n \times \sum_{i=1}^{i=n} \max(|vcxi|, |vcyi|, |vcyz|) \quad \text{(Formula 2)}$$

Figure 9A:
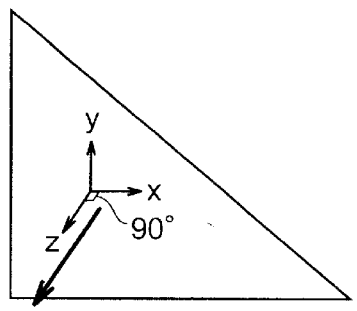
FIGS. 9A and 9A are diagrams showing a polygonal patch correction method.
Figure 9B:
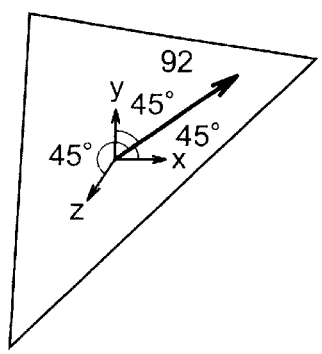

In formula 2, n is the number of polygonal patches, (vcxi, vcyi, vcyz) is the unit normal vector of a polygonal patch Pat (i), and max (a, b, c) is a function that selects the maximum of numeric values a, b, and c. Formula 2 indicates that the parallelism degree increases as the normal vector of a patch becomes parallel to any of the coordinate axes. The parallelism degree is maximized when a normal vector 91 is parallel with one of the coordinate axes as shown in FIG. 9A and, in this case, the value is 1.0. Also, the parallelism degree is minimized when a normal vector 92 of a patch is inclined at 45 degrees with each coordinate axis as shown in FIG. 9B and, in this case, the value is $(1/3)^{1/2} \approx 0.577$. The value may be obtained by strictly solving this problem. In this example, with the processing time in mind, the polygonal patches are rotated on the origin in the real space in the coordinate axis direction (x, y, z) from 0 degree to 90 degrees in increments of 30 degrees to calculate the parallelism degree of the polygonal patches for each posture. The coordinate values of the polygonal patches that maximize the parallelism degree are used as the corrected coordinate values.

Thus, if the polygonal patches are much inclined from the coordinate axes in the real space as shown in FIG. 9B, it is necessary to correct the coordinates of the polygonal patches so that the normal vectors become as much parallel as possible with the coordinate axes, for example, as shown in FIG. 9A. For the polygonal patches shown in FIG. 4B, the parallelism degree is maximized when the polygonal patches are not rotated.

Unless otherwise stated, it is assumed in the description below that the coordinate values and the directional vectors of the polygonal patches used by the mapping model generator 4 have been corrected.

ST3-1: Obtain the unit normal vector v=(vcx, vxy, vcz) for each polygonal patch for use as the initial value P=(P$_\xi$, P$_\eta$, P$_\zeta$) of the layout probability for the direction of the three coordinate axes ($\xi$, $\eta$, $\zeta$) in the mapping space. A normal vector may be obtained from the coordinate values of three continuous patch points constituting a polygonal patch.

ST3-2: Select the maximum absolute value of the layout probabilities P=(P$_\xi$, P$_\eta$, P$_\zeta$) for the coordinate axes as the layout direction of the polygonal patch. For example, if the layout probabilities are P=(−1.0, 0.0, 0.0), the layout direction is in the direction of $\xi$. Considering the sign, the layout direction is corrected if the value is negative. Therefore, in the example shown, the layout direction of the polygonal patch is in the direction of direction of −$\xi$.

ST3-3: Check if the mapping model conditions are satisfied. There are two mapping model conditions given below. If the conditions are satisfied, control is passed to ST3-5; if the conditions are not satisfied, control is passed to ST3-4.

Figure 10A:
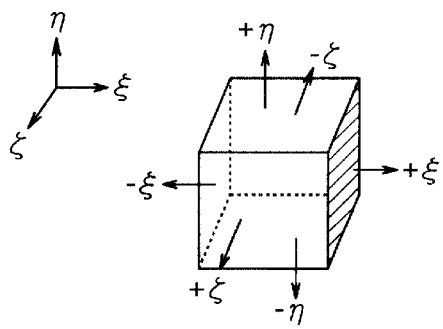
FIGS. 10A–10D are diagrams showing conditions for mapping model.
Figure 10B:
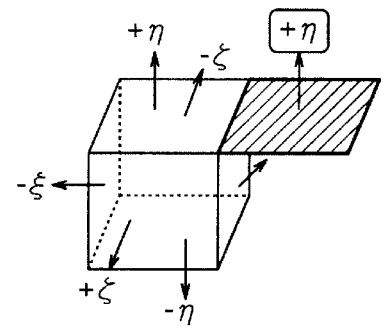

FIGS. 10A–10D show some examples in which condition 1 is satisfied and not satisfied and in which condition 2 is satisfied and not satisfied. [Condition 1] At least one polygonal patch is in the positive/negative direction of one of the ($\xi$, $\eta$, $\zeta$) axes. In FIG. 10A, the shaded patch is in the positive direction of the $\xi$ axis. On the other hand, in FIG. 10B, the shaded patch is in the positive direction of the $\eta$ axis and all patches are not in the positive direction of the $\xi$ axis. Therefore mapping model cannot be formed.

Figure 10C:
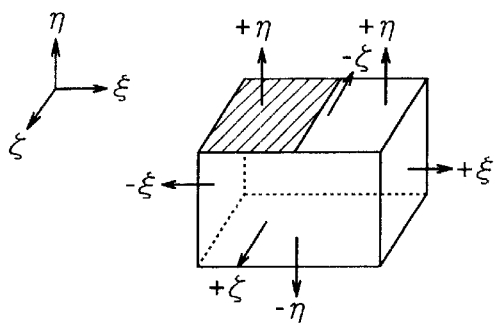
Figure 10D:
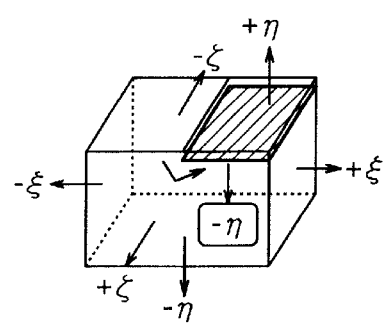

[Condition 2] As shown in FIG. 10C, the neighboring polygonal patches in the same plane are not in the positive direction and negative direction in the same axis direction. If the neighboring polygonal patches are in the positive direction and negative direction in the same plane as shown in FIG. 10D, they overlap in one plane and a mapping model cannot be formed.

ST3-4: Correct the polygonal patch layout probability. Before correction, the layout probability of each polygonal patch is saved for use in the calculation shown below. Let P=(P$_\xi$, P$_\eta$, P$_\zeta$) be the after-correction layout probability of a polygonal patch Pat for which layout probability correction is to be made, and let Pb=(P$_{\xi b}$, P$_{\eta b}$, P$_{\zeta b}$) be the before-correction layout probability. Also, let n be the number of polygonal patches that are in contact with the polygonal patch Pat via patch lines, and let Pbi=(P$_{\xi bi}$, P$_{\eta bi}$, P$_{\zeta bi}$) be the before-correction layout probability of a polygonal patch Pat(i):(i=1, 2, . . . n) that is in contact via a patch line. Then, the after-correction layout probability is as follows:

$$\begin{cases} P_\xi = P_{\xi b} + \beta/n \times \sum_{i=1}^{i=n} P_{\xi bi} \\ P_\eta = P_{\eta b} + \beta/n \times \sum_{i=1}^{i=n} P_{\eta bi} \\ P_\zeta = P_{\zeta b} + \beta/n \times \sum_{i=1}^{i=n} P_{\zeta bi} \end{cases} \quad \text{(Formula 3)}$$

$$\begin{cases} Val = \sqrt{P_\xi \times P_\xi + P_\eta \times P_\eta + P_\zeta \times P_\zeta} \\ P_\xi = P_\xi / Val \\ P_\eta = P_\eta / Val \\ P_\zeta = P_\zeta / Val \end{cases} \quad \text{(Formula 4)}$$

In the above formulas, $\beta$, about 0.1, is a parameter determining the degree of correction. Formula 3 smoothes the layout probability of the polygonal patch Pat with the layout probabilities of the neighboring polygonal patches Pat (i). Formula 4 normalizes the layout probability calculated by formula 3. After making these layout probability corrections for all polygonal patches, control is passed back to ST3-3 for checking the layout direction again.

ST3-5: Define the plane, line segments, and vertexes of the mapping model from the layout direction of the polygonal patches in the mapping space. In the description below, the plane, line segments, and vertexes of a mapping model are called a mapping plane, mapping line segments, and mapping points, respectively. Generically, they are called mapping shape elements. The mapping shape elements are defined according to the following procedure.

Figure 11:
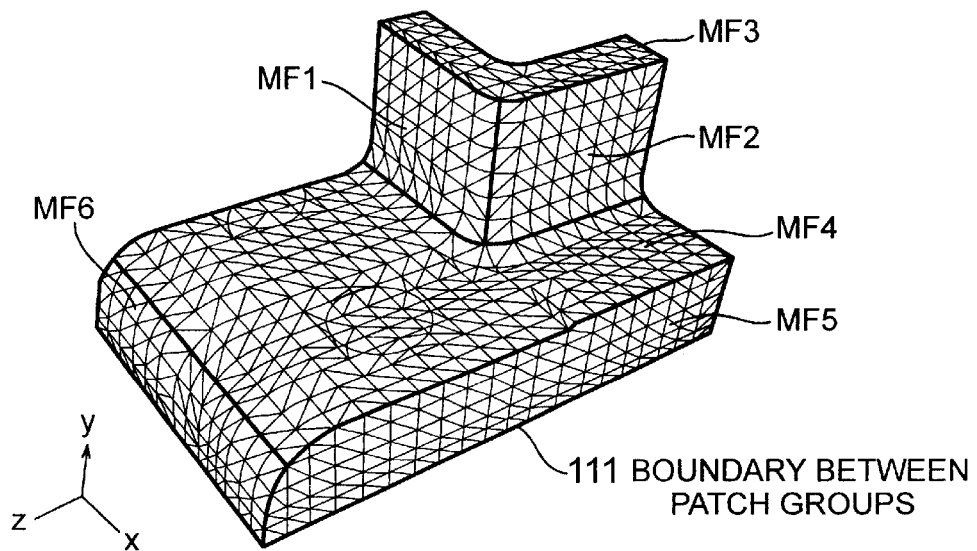
FIG. 11 is a diagram showing how polygonal patches are divided into groups.

ST3-5-1: Use a patch set generator to divide the polygonal patches into groups, each composed of those which are in contact with each other via patch lines and which have the same layout direction in the mapping space, to generate polygonal patch groups. FIG. 11 is a diagram showing the polygonal patches, shown in FIG. 4B, that have been divided into groups. The heavy (thick) lines 111 in the figure indicate the boundaries between patch groups. The generated polygonal patch groups, each with a unique plane number, are defined as mapping planes. In FIG. 11, MF1 indicates a mapping plane with the plane number 1. In this way, the patches are generated on the surface of the shape model and, then, the generated patches are grouped based on the normal vector directions. This automatically hides the line segments unnecessary for mapping model generation and allows line segments to be automatically added to desired positions. As a result, a mapping model geometrically similar to the shape model may be generated.

Figure 12:
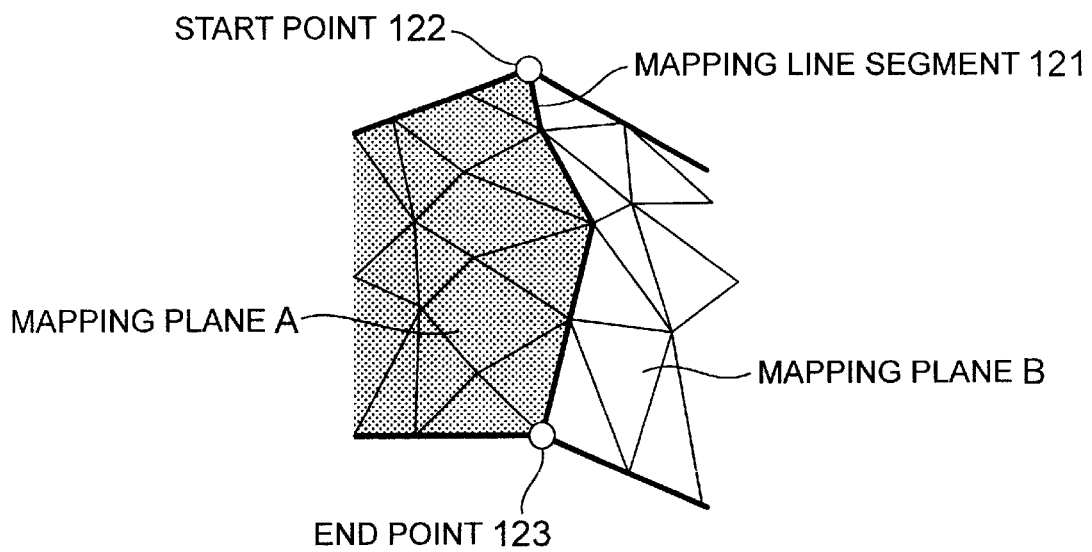
FIG. 12 is a diagram showing how a mapping line segment is defined.

ST3-5-2: Use a mapping model data generator to assign a unique line number to each of the patch lines constituting the boundaries between mapping planes defined in ST3-5-1 and to define those patch lines as a mapping line segment. At this time, the mapping line segment is defined as a line segment passing through the start point and the end point of all patch lines constituting the shared patch lines. For example, in FIG. 12, a mapping line segment 121 constituting the boundary between mapping planes A and B is defined as a line segment with a start point 122 and an end point 123.

ST3-5-3: Assign a unique point number to a patch point that is the end point of the mapping line segment defined in ST3-5-2 and define the point as the mapping point.

ST3-6: Determine the layout direction of a mapping plane and a mapping line segment in the mapping space. The layout direction of a mapping plane is the layout direction of the polygonal patches constituting the mapping plane.

The layout axis direction of a mapping line segment may be determined from the layout direction of the two mapping planes to which the mapping line segment belongs, based on the diagrammatic characteristics of the mapping model. For a mapping line segment belonging to two mapping planes, that is, ξ-axis plane and η-axis plane, the layout axis direction of the mapping line segment is ζ. Similarly, for a mapping line segment belonging to two mapping planes, that is, η-axis plane and ζ-axis plane, the layout axis direction of the mapping line segment is ξ. For a mapping line segment belonging to two mapping planes, that is, ζ-axis plane and ξ-axis plane, the layout axis direction of the mapping line segment is η. After determining the layout axis direction, the layout direction considering the sign is determined from the coordinate values of the start point and the end point of the line segment. For example, assume that the layout axis direction of a line segment is the ξ-axis. Then, the x-coordinate value of the start point is compared with that of the end point. If the x-coordinate value of the start point is smaller than the x-coordinate value of the end point, the layout direction of the mapping line segment is −ξ; otherwise, the layout direction is +ξ. Although the layout axis direction of a mapping line segment for the ξ-axis has been described, the layout direction of a mapping line segment for the η-axis and ζ-axis may also be determined from the y-coordinate values and the z-coordinate values of the start point and the end point.

ST3-7: Determine the coordinate values (ξ, η, ζ) of the mapping points in the mapping space. The coordinate values may be determined by two factors: one is the layout direction of the mapping plane and the other is the real space coordinate values of the patch points belonging to a polygonal patch constituting the mapping plane. For example, when the layout direction of a mapping plane is ξ-axis, the ξ coordinate value of a mapping point belonging to the mapping plane may be determined from the x-coordinate value of a patch point belonging to the mapping plane. Let P1, P2, ..., Pn be the patch points belonging to the mapping plane, let xi be the x-coordinate value of the patch point pi, and let L be the standard element size.

$$\xi = (int)\sum_{i=1}^{i=n} xi/L \quad \text{(Formula 5)}$$

In formula 5, (int) means that a real value obtained from the calculation is converted to an integer value. Although how the coordinate values in the ξ direction are determined has been described, the coordinate values in the η direction and the ζ direction may also be determined from the coordinate values in the y and z directions of a patch point.

ST3-8: Store the mapping model data determined in the above steps into the model database 6. FIGS. 13A–13C show examples of the data structure of mapping model data. The table shown in FIG. 13A contains information on the layout directions of mapping planes in the mapping space and information on the set of patch planes constituting each mapping plane. The table shown in FIG. 13B contains information on the layout directions of the mapping line segments in the mapping space and information on the set of patch lines constituting each mapping line segment. The table shown in FIG. 13C contains information on the coordinate values (before correction) of each mapping point in the mapping space and in the real space. These tables are stored for each mapping shape element.

Figure 4C:
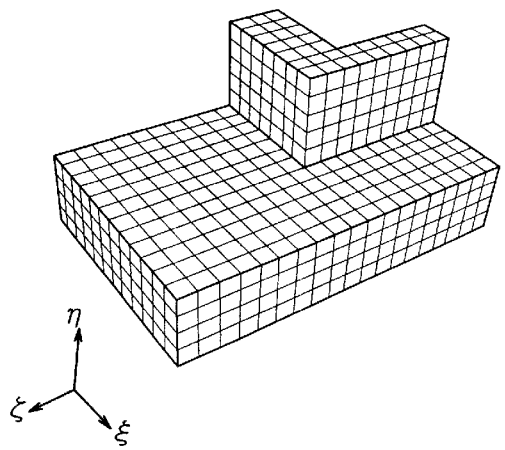
Figure 4D:
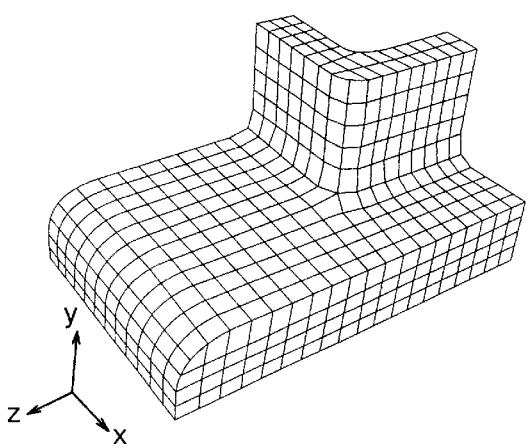

The above processing generates the mapping model shown in FIG. 4C from the polygonal patches shown in FIG. 4B.

Figure 14A:
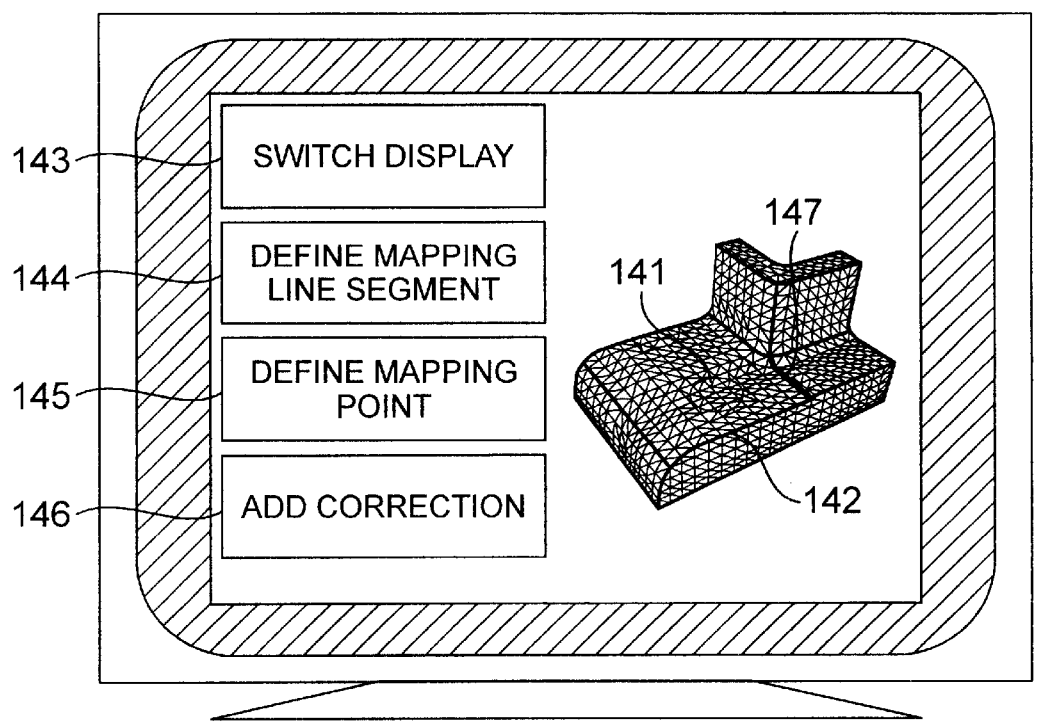
FIGS. 14A and 14B are diagrams showing an correction.

The mapping shape elements defined by the mapping model generator 4 may be displayed for confirmation on the display 1a in response to a request from the system user. FIG. 14A shows an example of the screen on which polygonal patches 141 and mapping shape elements 142 are displayed at the same time. In the figure, selecting a Switch display button 143 turns on or off the display of mapping shape elements. If, after checking the screen, the system user finds that one or more mapping line segments or mapping points are not defined at a desired position, he or she may define mapping shape elements interactively. To define mapping shape elements, use a Define mapping line segment button 144 or a Define mapping point button 145 to add the patch lines and patch points, which constitute a mapping line segment to be defined, to the tables shown in FIGS. 13A–13C. Selecting an Add correction button 146 adds the defined mapping shape element to the mapping model.

How the layout direction of a mapping line segment defined by the system user is determined will be described. Depending upon the layout direction of the mapping plane to which a mapping line segment is to be added, the layout direction of the mapping line segment is limited to four directions (for example, if the layout direction of the mapping plane is the ξ-axis, then the layout direction of the mapping line segment is limited to ±η and ±ζ). Therefore, these four directions are applied, one at a time, and one of them that satisfies the conditions described below is selected as the layout direction of the mapping line segment.

Figure 17A:
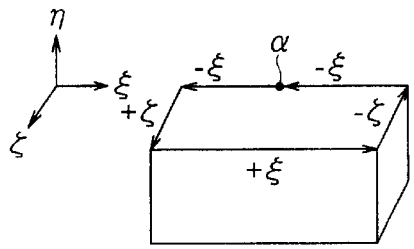
FIGS. 17A–17D are diagrams showing conditions for a mapping model.
Figure 17B:
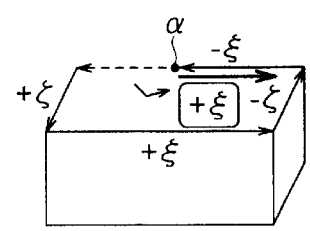

[Condition 3] As shown in FIG. 17A, for the lines constituting the mapping plane boundary to which the defined mapping line segment belongs, the mapping line segments joined through a point are on the same axis and in the same direction. That is, as shown in FIG. 17A, the mapping line segments joined at the point a may be defined by −ξ. On the other hand, as shown in FIG. 17B, because the line segments defined by −ξ and +ξ at the point a overlap with each other as indicated by the heavy line arrow in the figure, the condition is not satisfied.

Figure 17C:
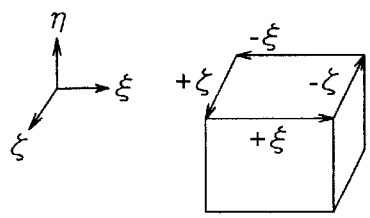
Figure 17D:
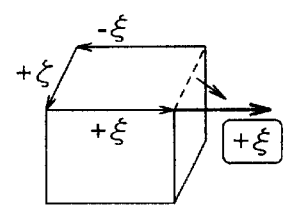

[Condition 4] As shown in FIG. 17C, for the lines constituting the mapping plane boundary to which the defined mapping line segment belongs, there is at least one mapping line segment in the positive/negative direction for two coordinate axes. That is, there is a line segment in the direction of −ξ and +ξ and in the direction of −ζ and +ζ. On the other hand, as shown in FIG. 17D, if there is no −ζ and there are two +ξ, then the condition is not satisfied. If there is no layout direction satisfying these two conditions (condition not satisfied), a message indicating the fact is sent to the system user to allow him or her to return the model to the state before mapping shape definition.

Figure 14B:
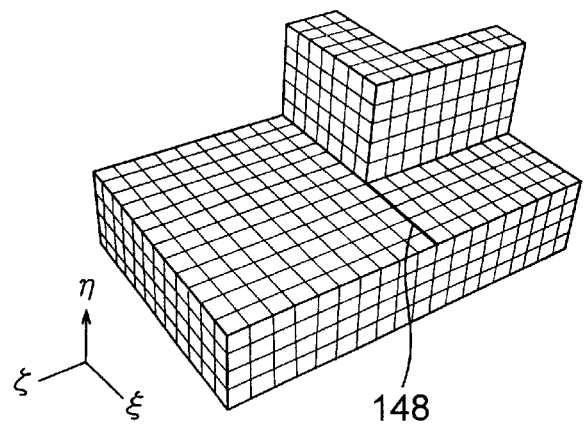

FIG. 14B shows a mapping model generated when patch lines 147 shown in FIG. 14A are defined as a mapping line segment. As shown in the mapping model in FIG. 14B, a mapping line segment 148 is added. Although the system user specifies a patch line or a patch point in the above example, he or she may also specify a line segment or a vertex of the shape model. In this case, a patch line or a patch point associated with the specified line segment or the vertex is defined as a mapping shape.

3.4 Analysis Mesh Generator

Figure 15A:
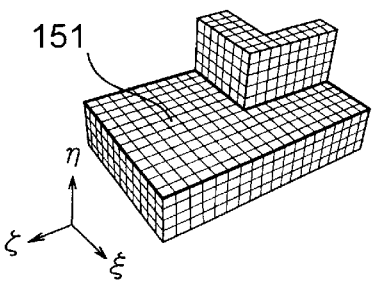
FIGS. 15A–15G are diagrams showing how a surface mesh is generated.

The analysis mesh generator 5 generates a surface mesh on the surface of an analysis object shape based on the grid points on the surface of a mapping model generated first by the mapping model generator 4. A surface mesh is generated according to the procedure described in ST4-1 to ST4-7 that will be described below. In the description below, the processing steps will be described with the generation of a surface mesh on a plane 151, surrounded by the heavy line in the mapping model shown in FIG. 15A, as an example.

Figure 15B:
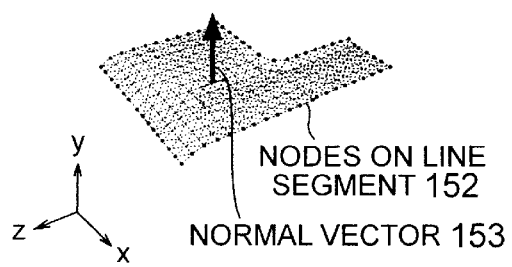

ST4-1: First, determine the positions of the nodes on a mapping line segment as shown by the numeral 152 in FIG. 15B. For example, when the start point coordinate values of a mapping line segment of a mapping model are (1,1,1) and the end point coordinate values are (8,1,1), six nodes are placed on the mapping line segment. Because the external line segment is defined as a set of a plurality of patch lines, the nodes are placed on the patch lines so that the nodes equally divide the patch lines set into seven. In this way, the nodes are placed on all external line segments.

ST4-2: Next, find the normal line direction (normal line vector) of the mapping plane as shown by the numeral 153 in FIG. 15B. Find the normal line vectors of all polygonal patches constituting the mapping plane and average those vectors to produce the normal line vector of the mapping plane.

Figure 15C:
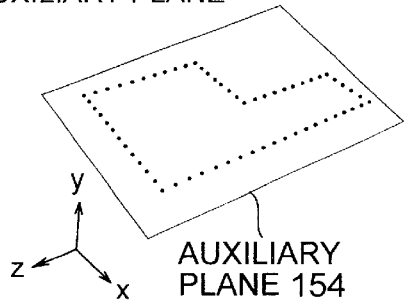

ST4-3: Next, as shown in FIG. 15C, generate an auxiliary plane 154 which includes the origin and whose normal vector coincides with the normal vector of the mapping plane. Then, move the nodes on the mapping line segment obtained in ST4-1 into the direction of the normal vector of the mapping plane and project the nodes on the auxiliary plane.

Figure 15D:
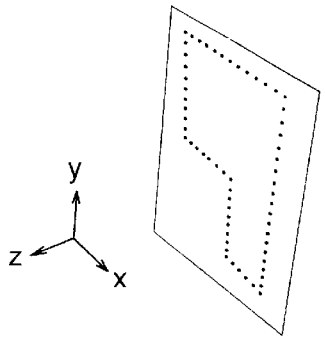

ST4-4: Next, as shown in FIG. 15D, rotate on the origin the auxiliary plane, as well as the nodes projected on the auxiliary plane, so that the plane match the XY plane.

Figure 15E:
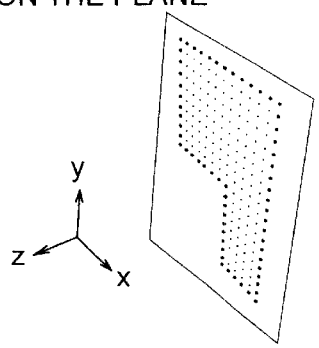

ST4-5: Use the quadratic Laplace equation (formula 6) to find the auxiliary plane coordinate values of the grids on the external surface, as shown in FIG. 15E. In this case, the coordinate values of the nodes on the external line segment are the boundary condition.

$$\begin{cases} \partial^2 \xi/\partial x^2 + \partial^2 \xi/\partial y^2 = 0 \\ \partial^2 \eta/\partial x^2 + \partial^2 \eta/\partial y^2 = 0 \end{cases} \quad \text{(Formula 6)}$$

Figure 15F:
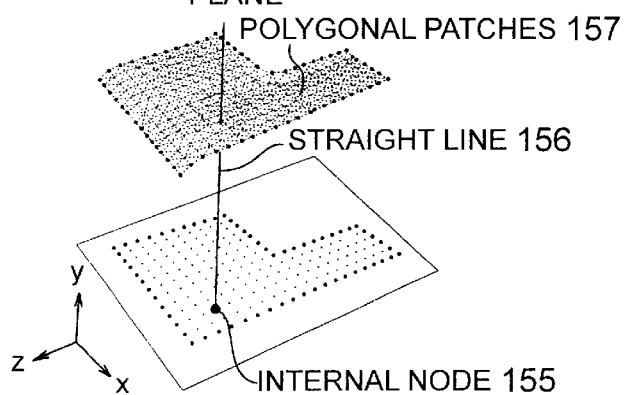

ST4-6: Next, as shown in FIG. 15F, rotate the auxiliary plane 154, as well as all nodes on the auxiliary plane, in the direction opposite to the rotation direction in ST4-4.

Figure 15G:
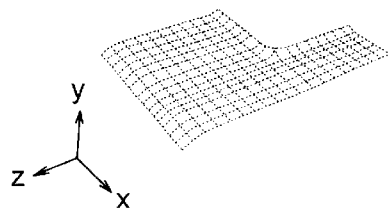

ST4-7: Then, determine the coordinate values of the nodes on the external surface. The coordinate values on the external surface are determined according to the procedure described below. First, a straight line 156 shown in FIG. 15F is created from coordinate values of a node 155, shown in FIG. 15F and obtained in ST4-6, into the ± direction of the normal vector on the external surface obtained in ST4-2. Then, the point of intersection of this straight line 156 and all polygonal patches 157 constituting the external surface is calculated. Because the straight line intersects at least one polygonal patch, the coordinate values of the point of intersection are used as the node coordinate values (internal node 155) on the external surface. This processing is performed, as shown in FIG. 15G, for all nodes that were rotated in ST4-6 and that are not on the external line.

A surface mesh is generated for the analysis object shape by performing all processing steps ST4-1-ST4-7 for the external surface.

Then, the analysis mesh generator 5 determines the coordinate values of the nodes within the analysis object shape.

To determine the coordinate values of an internal node, interpolation is performed for the nodes, based on the solid mapping model shape, with already-determined coordinate values of the nodes on the external surface as the boundary condition. Interpolation is performed, for example, by solving the cubic Laplace equation (formula 7) given below to find the node coordinate values.

$$\begin{cases} \partial^2 \xi/\partial x^2 + \partial^2 \xi/\partial y^2 + \partial^2 \xi/\partial z^2 = 0 \\ \partial^2 \eta/\partial x^2 + \partial^2 \eta/\partial y^2 + \partial^2 \eta/\partial z^2 = 0 \\ \partial^2 \zeta/\partial x^2 + \partial^2 \zeta/\partial y^2 + \partial^2 \zeta/\partial z^2 = 0 \end{cases} \quad \text{(Formula 7)}$$

Figure 4E:
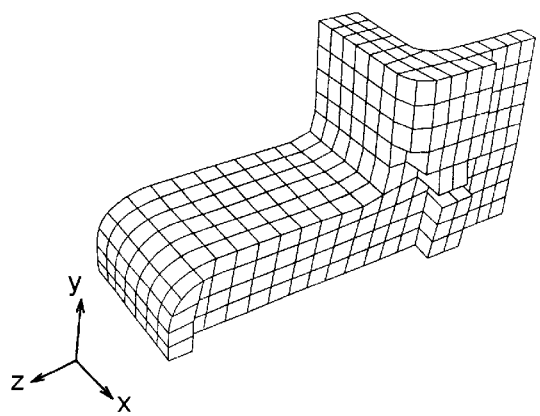

This generates the hexahedral mesh shown in FIG. 4D from the shape model shown in FIG. 4A. FIG. 4E shows a part of the hexahedral mesh to help understand that the mesh is generated even internally.

Figure 16A:
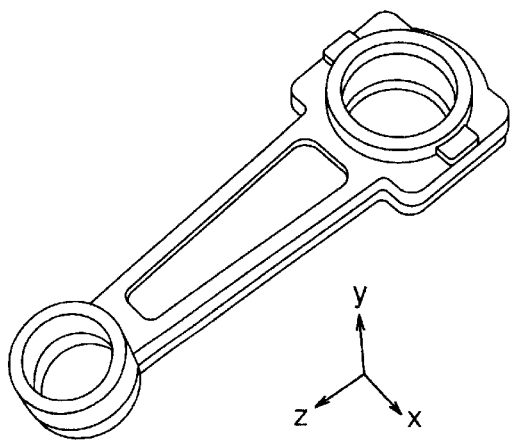
FIGS. 16A–16D are diagrams showing an example of a hexahedral mesh according to the present invention.
Figure 16B:
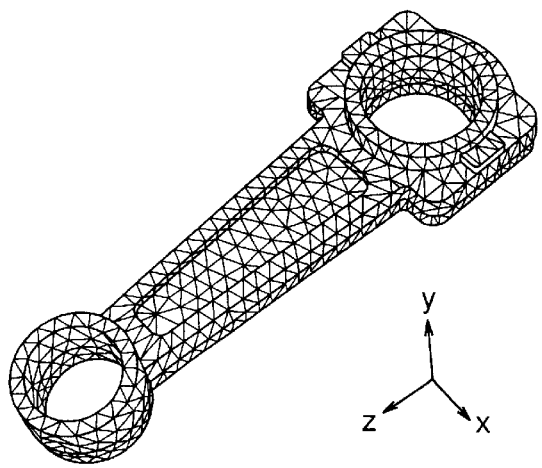
Figure 16C:
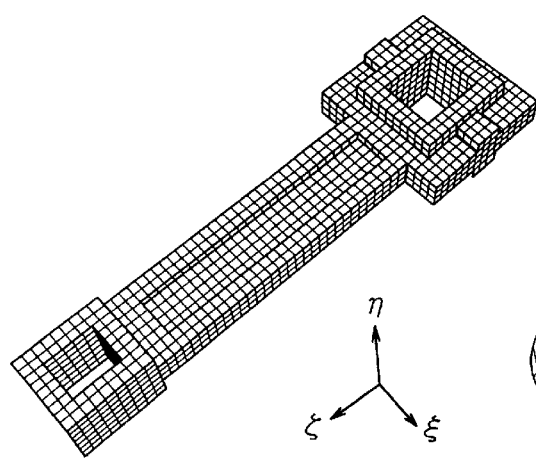
Figure 16D:
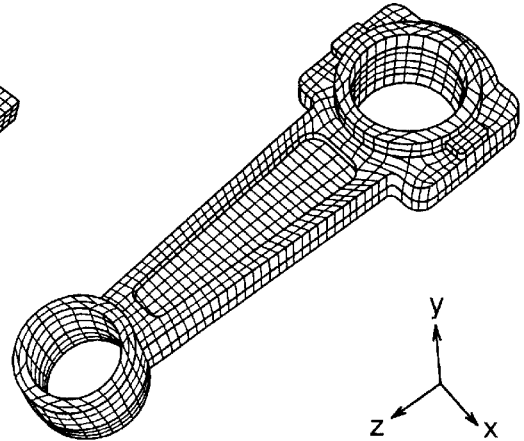

FIGS. 16A–16D shows some other examples of generating an analysis mesh using the mesh generation method according to the present invention. The polygonal patches shown in FIG. 16B are generated for the shape model shown in FIG. 16A and, from these polygonal patches, the mapping model shown in FIG. 16C and the hexahedral mesh shown in FIG. 16D are automatically generated.

The device and method according to the present invention generate polygonal patches on the surface of an analysis object shape model and, from the boundaries between these polygonal patches, automatically select the line segments necessary for mapping model generation. This eliminates the need for shape editing that has been a problem in the conventional mapping method and automatically generates a hexahedral mesh that allows analysis to be made more precisely with fewer elements.

While the preferred form of the present invention has been described, it is to be understood that the present invention is not limited to the embodiments but that modifications will be apparent to those skilled in the art without departing from the spirit of the present invention.

What is claimed is:

1. A hexahedral mesh generation method comprising the steps of:

reading an analysis object shape model;

generating polygonal patches on a surface of the shape model;

generating a mapping model, which is modeled after the shape model using a grid, from the polygonal patches; and generating an analysis mesh from the mapping model.

2. A hexahedral mesh generation method comprising the steps of:

reading polygonal patches that form a surface of an analysis object shape;

generating a mapping model, which is modeled after a shape model using a grid, from the polygonal patches; and generating an analysis mesh from the mapping model.

3. The hexahedral mesh generation method according to claim 1, further comprising the steps of:

generating sets of the polygonal patches; and generating planes, lines, and points of the mapping model from the generated sets.

4. The hexahedral mesh generation method according to claim 2, further comprising the steps of:

generating sets of the polygonal patches; and generating planes, lines, and points of the mapping model from the generated sets.

5. The hexahedral mesh generation method according to claim 3, wherein normal vectors of the polygonal patches are obtained and the sets of the polygonal patches are generated using the normal vectors.

6. The hexahedral mesh generation method according to claim 4, wherein normal vectors of the polygonal patches are obtained and the sets of the polygonal patches are generated using the normal vectors.

7. The hexahedral mesh generation method according to claim 3, further comprising the step of, before generating the sets of the polygonal patches, correcting coordinate values of the polygonal patches.

8. The hexahedral mesh generation method according to claim 4, further comprising the step of, before generating the sets of the polygonal patches, correcting coordinate values of the polygonal patches.

9. The hexahedral mesh generation method according to claim 7, wherein the coordinate values of the polygonal patches are corrected using normal vectors of the polygonal patches.

10. The hexahedral mesh generation method according to claim 8, wherein the coordinate values of the polygonal patches are corrected using normal vectors of the polygonal patches.

11. The hexahedral mesh generation method according to claim 1, further comprising the step of setting up a rule to define a layout of the polygonal patches to be generated.

12. A hexahedral mesh generation device comprising:
    a shape model reader reading an analysis object shape model;
    a polygonal patch generator generating polygonal patches on a surface of the shape model;
    a mapping model generator generating a mapping model, which is modeled after the shape model using a grid, from the polygonal patches; and
    an analysis mesh generator generating an analysis mesh from the mapping model.

13. A hexahedral mesh generation device comprising:
    a polygonal patch reader reading polygonal patches that form a surface of an analysis object shape;
    a mapping model generator generating a mapping model, which is modeled after the analysis object shape using a grid, from the polygonal patches; and
    an analysis mesh generator generating an analysis mesh from the mapping model.

14. The hexahedral mesh generation device according to claim 12, further comprising:
    a patch set generator generating sets of the polygonal patches; and
    a mapping model data generator generating planes, lines, and points of the mapping model from the patch sets.

15. The hexahedral mesh generation device according to claim 13, further comprising:
    a patch set generator generating sets of the polygonal patches; and
    a mapping model data generator generating planes, lines, and points of the mapping model from the patch sets.

16. The hexahedral mesh generation device according to claim 14, wherein said patch set generator generates the sets of the polygonal patches using normal vectors of the polygonal patches.

17. The hexahedral mesh generation device according to claim 15, wherein said patch set generator generates the sets of the polygonal patches using normal vectors of the polygonal patches.

18. The hexahedral mesh generation device according to claim 12, further comprising a patch corrector correcting coordinate values of the polygonal patches.

19. The hexahedral mesh generation device according to claim 13, further comprising a patch corrector correcting coordinate values of the polygonal patches.

20. The hexahedral mesh generation device according to claim 18, wherein said patch corrector corrects the coordinate values of the polygonal patches using normal vectors of the polygonal patches.

21. The hexahedral mesh generation device according to claim 19, wherein said patch corrector corrects the coordinate values of the polygonal patches using normal vectors of the polygonal patches.

22. The hexahedral mesh generation device according to claim 12, further comprising a rule setter setting up a rule to define a layout of the polygonal patches to be generated.

23. The hexahedral mesh generation device according to one of claim 12, wherein a function is provided to allow the polygonal patches and planes, lines, and points of the mapping model to be overlaid on a display.

24. The hexahedral mesh generation device according to one of claim 13, wherein a function is provided to allow the polygonal patches and planes, lines, and points of the mapping model to be overlaid on a display.

25. The hexahedral mesh generation device according to claim 14, further comprising:
    means for specifying line segments and vertexes of the shape model; and
    means for adding the specified line segments and vertexes to the mapping model.

26. The hexahedral mesh generation device according to claim 15, further comprising:
    means for specifying line segments and vertexes of the shape model; and
    means for adding the specified line segments and vertexes to the mapping model.

27. The hexahedral mesh generation device according to claim 14, further comprising:
    means for specifying boundaries of the polygonal patches and vertexes of the polygonal patches; and
    means for adding the specified boundaries of the polygonal patches and the vertexes of the polygonal patches to the mapping model as lines and points of the mapping model.

28. The hexahedral mesh generation device according to claim 15, further comprising:
    means for specifying boundaries of the polygonal patches and vertexes of the polygonal patches; and
    means for adding the specified boundaries of the polygonal patches and the vertexes of the polygonal patches to the mapping model as lines and points of the mapping model.

* * * * *